Figure 1:
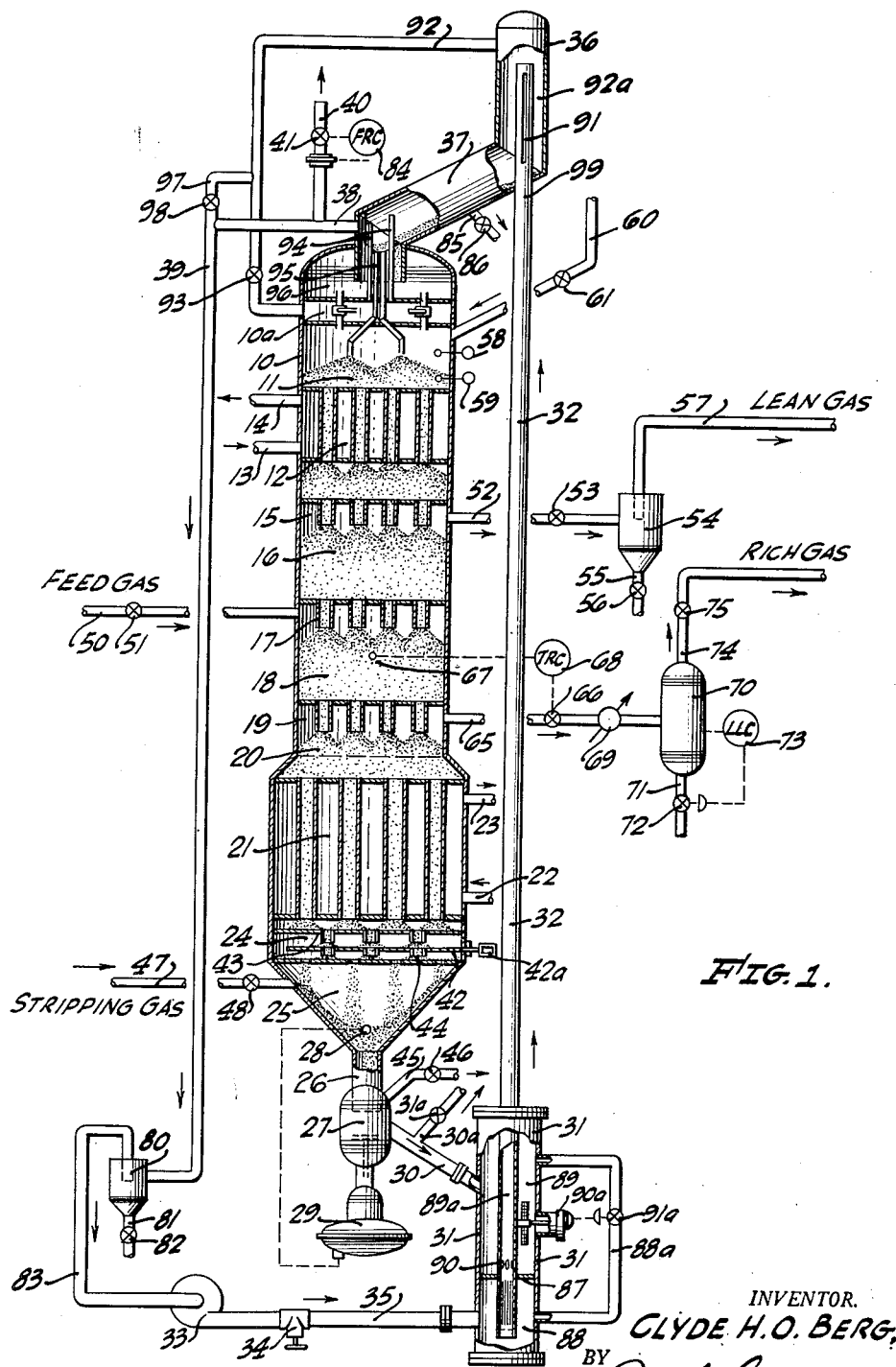

Nov. 16, 1954    C. H. O. BERG    2,694,605
ADSORPTION PROCESS
Filed Sept. 7, 1948    2 Sheets-Sheet 1

INVENTOR.
CLYDE H. O. BERG,
BY
Ross J. Garofalo
ATTORNEY.

Nov. 16, 1954
C. H. O. BERG
2,694,605
ADSORPTION PROCESS
Filed Sept. 7, 1948
2 Sheets-Sheet 2
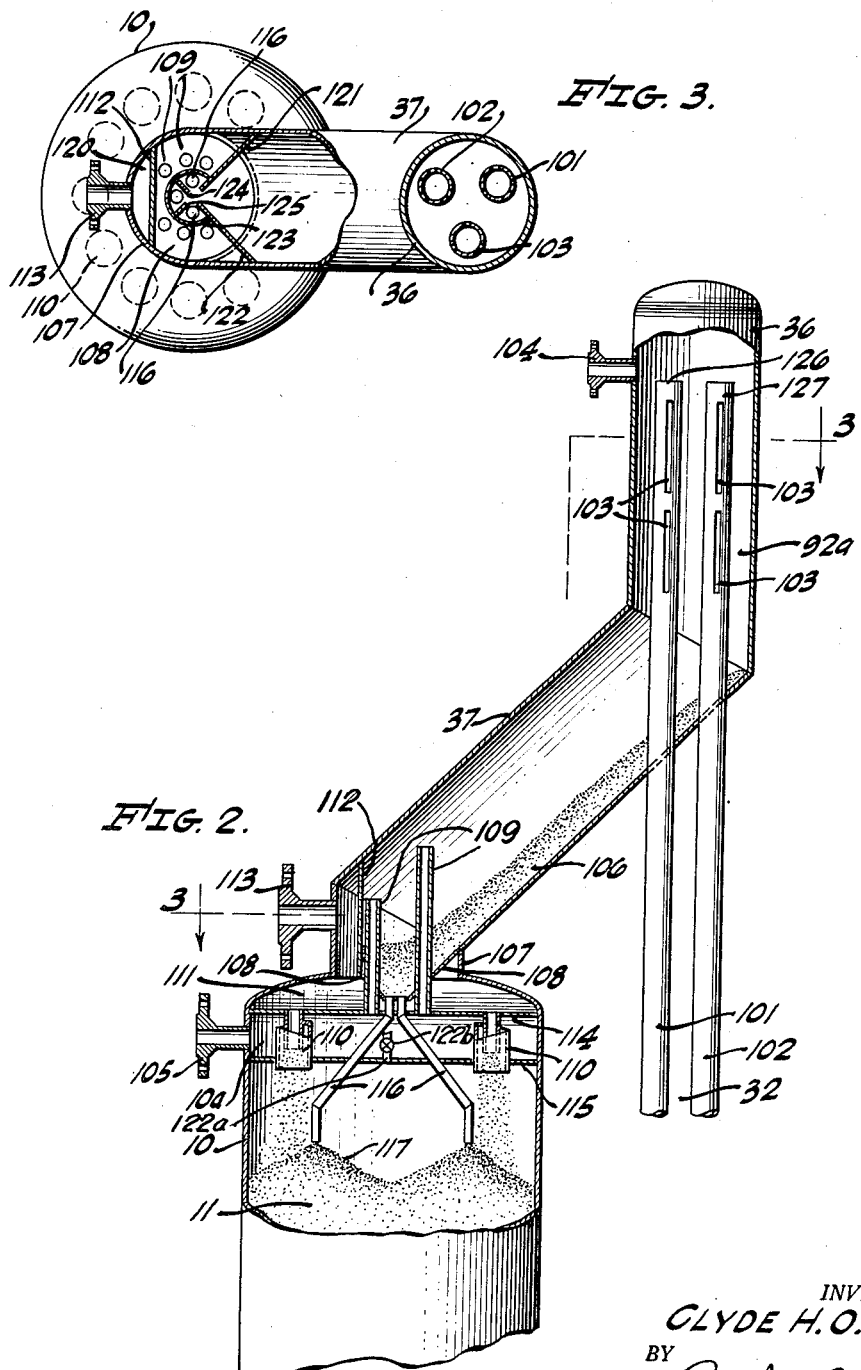
INVENTOR.
CLYDE H. O. BERG,
BY
Ross J. Garofalo
ATTORNEY.

United States Patent Office 2,694,605
Patented Nov. 16, 1954

2,694,605

ADSORPTION PROCESS

Clyde H. O. Berg, Long Beach, Calif., assignor to Union Oil Company of California, Los Angeles, Calif., a corporation of California Application September 7, 1948, Serial No. 47,966

10 Claims. (Cl. 302—53)

This invention relates to an improved process and apparatus for the separation of gaseous mixtures by continuous selective adsorption and in particular this invention pertains to a selective adsorption process and apparatus which has been improved by incorporation of a method and apparatus for the conveyance of granular solids by means of which the attrition rate of the granular solids circulated is substantially reduced. Although this method and means for the conveyance of solid granular adsorbent has proved highly effective in increasing the efficiency and ease of operation of the selective adsorption process, it may also be applied with equal effectiveness to the conveyance of other granular materials including catalysts which are circulated through treating vessels, regeneration vessels, and the like.

There are numerous operations in which the movement of finely ground, crushed, powdered or other granular solids is required. Nearly any industrial operation or process in which the raw materials, reagents, intermediate products, final products, or by-products are solids requires facilities for transporting such solids from one place to another. This is true in metallurgical processes, clarification processes involving adsorption, catalytic processes, miscellaneous grinding, screening and classification processes, the manufacture of plastics and many others. In nearly all of these, application of the conveyance method of the present invention may be employed to advantage.

Selective adsorption processes for the separation of gaseous mixtures and catalytic processes for the manufacture of synthetic fuels and synthetic organic chemicals may employ a continuously moving bed of granular adsorbent or catalyst which is recirculated through a vessel or vessels. In such a process the flowing solid may pass downwardly by gravity through a tower, column or other vessel to the bottom from which it is removed and conveyed to a reactivation or regeneration zone, or it may be recirculated to the top of the vessel from which it was removed. The conveyance of these solids is of the utmost importance to the process and it has been accomplished heretofore by means of elevators, screws, or other similar mechanical means. In such mechanical means for solids conveyance the chief disadvantage has been the high loss of solids circulated due to abrasion, grinding, and other mechanical attrition which tends to form fines. In the circulation of expensive catalysts and adsorbents, and the like, the method and apparatus for solids conveyance according to this invention achieve results which are highly desirable by markedly decreasing such attrition losses.

It is, therefore, a primary object of this invention to provide an improved process for the separation of gaseous mixtures by selective adsorption in which losses of granular adsorbent due to attrition are substantially reduced.

It is a further object of this invention to supplement the selective adsorption process with a method for conveyance of the circulated granular adsorbent with a minimum of fines formation thereby maintaining a low pressure drop for gases or vapors flowing the granular solids bed.

Another object of this invention is to provide a method for the conveyance of substantially any type of granulated solids including adsorbents, catalysts such as those employed in continuous catalytic cracking operations in which a moving bed or suspension of catalyst is used, chemicals, agricultural products such as grains, industrial commodities such as sand, pulverized cement, finely divided minerals such as ores, and the like with a minimum of loss due to abrasion or attrition.

It is an additional object of this invention to provide for the increased ease of handling of granular pulverized or other finely divided solid materials as hereinafter more fully described.

Another object of this invention is to provide for increasing the operational efficiency of continuous processes employing the circulation of moving beds of solid granular materials through treating systems by decreasing solids losses due to attrition and abrasion.

Another object of this invention is to provide an improved apparatus for the separation of gaseous mixtures by continuous selective adsorption.

It is another object of this invention to provide an improved means for conveyance of granular solids substantially without fines formation due to attrition.

Other objects and advantages of this invention will become apparent to those skilled in the art as the description thereof proceeds.

Briefly, the present invention comprises an improved selective adsorption process in which a moving bed of solid granular adsorbent is passed continuously downwardly by gravity through an adsorption system to contact the gaseous mixture to be separated in an adsorption zone. In this adsorption zone the more readily adsorbable constituents are adsorbed forming a rich adsorbent leaving a lean gas product containing substantially unadsorbed constituents. The rich adsorbent is passed into a desorption zone where it is indirectly heated and contacted with a stripping gas such as steam to effect desorption of the more readily adsorbable constituents forming a rich gas product and leaving a lean adsorbent. The lean gas product is removed from the adsorption zone and the rich gas product is removed from the desorption zone, each being substantially uncontaminated by constituents desired in the other. The lean adsorbent is removed from the lower portion of the desorption zone, suspended in a lift gas in an induction zone to form an adsorbent-lift gas suspension, and passed through a conduit to an impactless separator zone containing an extension of the conveyance zone which is herein termed an extension zone and a settling zone comprising the remainder of the separator zone. The extension zone preferably comprises at least one tubular member having substantially the same diameter as the lift line conduit. The suspended granular adsorbent is herein separated from the lift gas and the thus separated adsorbent is returned to the adsorption system substantially without loss by attrition. The lift gas may, if desired, be reemployed in the conveyance of further quantities of lean adsorbent by continuously recirculating the lift gas removed from the separation zone to the lower portion of the conduit where further quantities of adsorbent are suspended therein.

The improvement in the selective adsorption process and also to any other process wherein moving beds of finely divided materials are employed and conveyed or circulated arises from an exceedingly low rate of attrition when the solids being handled are transported according to the conveyance method and apparatus of the present invention. A substantial portion of the attrition rate reduction is due to the manner in which the solids are separated from the lift gas in the separation zone mentioned above. As the lift gas suspension moves through the conveyance zone or conduit into the impactless separation zone it enters the extension zone in which the lift gas velocity is gradually decreased from above the settling velocity to below it permitting the moving solids to dissipate momentum energy gradually against the force of gravity. The arresting of particle momentum may be effected in time intervals from as low as about 0.1 second or less to as high as 5 or 10 seconds or more depending upon the size and velocity of the particle. The lowering of lift gas pressure and velocity is effected over time intervals ranging from as low as 0.01 second to as high as 3 to 5 seconds or more. When this energy is dissipated the particles move out of the extension zone through apertures into the settling zone wherein the separated solids and the lift gas exist as substantially separate and independent phases. The decrease in lift gas velocity is effected by permitting the lift gas to flow laterally from the extension zone into the settling zone thus removing its motivating effect along the lift line axis on the solid particles being conveyed.

The lift gas velocity is not decreased rapidly as in the case where the gaseous suspension of solid materials is discharged coaxially from a lift line into a larger volume. The low energy particles which have been substantially separated from the lift gas are not permitted to interfere with the high energy particles which are at the time still acted upon by the motive forces of the lift gas. The lift gas velocity is decreased gradually permitting the high energy particles to lose momentum against gravity and move laterally away from the space into which the high energy particles are introduced. In effecting this, the abrasion resulting from the intimate contact of low energy and high energy particles is substantially eliminated and a simple, smooth and efficient reversal of particle direction and the separation of suspended particles from the lift gas is effected.

The process of selective adsorption is based upon the preferential adsorption phenomena exhibited by certain granular solid adsorbents in which some constituents of a gaseous mixture are adsorbed more strongly than other constituents. In general, those constituents having the higher molecular weights, the higher boiling points, or the higher critical temperatures are adsorbed more strongly. Distinct advantages are noted in the selective adsorption process over the conventional absorption, extraction and distillation processes in separating certain gaseous mixtures. Compared to the extreme conditions sometimes necessary in conventional processes, gaseous mixtures may be separated by the selective adsorption process at substantially atmospheric temperatures and pressures, with moderate pressures such as between 10 and several hundred pounds per square inch absolute and moderate temperatures as from between 80° F. and 500° F.

Details of the method and apparatus involved in the improved selective adsorption process are most readily presented in conjunction with the accompanying drawings in which:

Figure 1 presents a combination vertical cross sectional elevation of a selective adsorption column in which the improved separation process is carried out;

Figure 2 shows an elevation view of a cross section of the separation zone and the elutriation zone in which solid particles are separated with greater efficiency from lift gas suspensions; and Figure 3 shows a plan view of the apparatus shown in Figure 2 to facilitate the description thereof.

The term "stalling velocity" used in the following description is defined as the minimum lineal velocity of lift gas in the lift line at which the gas-solid suspension may be transported without settling. It is also the velocity at which the lift line differential pressure is at a minimum.

The term "lift line velocity," and "lifting velocity" are defined as the lineal lift gas velocity in an operating lift line.

The term "settling velocity" is defined as the rate at which a particle falls by gravity through a medium comprising still lift gas. From 12 to 30 mesh charcoal in air, the settling velocity is about 10 feet per second and varies with other solids and gases depending upon density of the solid and gas and upon the viscosity of the gas.

It should be understood that although the combination of the pneumatic conveyance method of this invention with the adsorption process is of unusual merit, as will be apparent from the following description, this description is not intended to limit the use of the conveyance method and apparatus of this invention to use with the particular adsorption processes described since the conveyance described hereinafter may be applied to other adsorption processes in which three, four or more fractions are produced as well as to many processes and apparatuses in which powdered, granulated, or other divided solids are handled.

Referring now more particularly to Figure 1, a brief description of one modification of the selective adsorption process follows.

Selective adsorption column 10 is provided at successively lower levels with centrifugal separator zone 10a, adsorbent hopper or storage zone 11, adsorbent cooling zone 12 provided with inlet 13 and outlet 14, lean gas disengaging zone 15, adsorption zone 16, feed gas engaging zone 17, rectification zone 18, rich gas disengaging zone 19, steaming zone 20, heating zone 21 provided with inlet 22 and outlet 23, adsorbent flow control zone 24 and bottom zone 25. Flow control zone comprises a mechanical feeder in which a movable plate 42 is given a reciprocating motion by motive means 42a. The tubes of movable plate 42 are alternately filled when aligned with tubes of stationary tray 43 and emptied through perforated tray 44 when aligned with the holes therein.

This mechanical feeder is more clearly described and claimed in my copending application, Serial No. 618,347, filed September 24, 1945, now U. S. Patent No. 2,544,214.

The solid granular adsorbent passes downwardly by gravity as a dense phase in a moving bed successively through the aforementioned zones from adsorbent hopper 11 to flow control zone 24 and collects in bottom zone 25. The adsorbent is removed from bottom zone 25 through sealing leg 26 and is passed through adsorbent flow control valve 27. Valve 27 serves to maintain bottom zone 25 partly full of adsorbent and is actuated by level control means 28 operating through pneumatic or electrical controller 29 causing valve 27 to open or close. The adsorbent passing through valve 27 passes downwardly by gravity through transfer line 30 and is introduced into induction zone 31.

This induction zone serves to form an adsorbent-lift gas suspension which is subsequently conveyed through conduit 32 as a lift line to impactless separator 36 wherein the suspended adsorbent granules are separated substantially without attrition and introduced into the upper portion of selective adsorption column 10.

The operation and control details of induction zone 31 and a multitube lift line are more clearly described and claimed in my copending application Serial No. 18,913, filed April 5, 1948.

Briefly, however, induction section or induction zone 31 is provided with a transverse division in the form of lateral plate 87 forming lift gas inlet zone 88 and an adsorbent inlet zone 89, below and above, respectively. Lift line 32, which may comprise a multiplicity of parallel tubes of circular or other shaped cross section, extends through adsorbent inlet zone 89, transverse plate 87 and into lift gas inlet zone 88. That portion of lift line 32 extending through the adsorbent inlet zone comprises suspension zone 89a in which a lift gas-adsorbent suspension is formed from adsorbent granules entering from adsorbent inlet zone via perforations 90. Perforations 90 may comprise bored or punched holes, slots, a screened section or the like to permit passage of the granules into suspension zone 89a. The lift gas is introduced by means of lift gas blower 33 controlled by valve 34 through line 35 into lift gas inlet zone 88 and into the open end of the tubes present therein to suspension zone 89a wherein the suspension is formed. Level control mechanism 90a is actuated by the change in the solids level in solids inlet zone 89. A portion of lift gas is passed via line 88a at a rate controlled by valve 91a into solids inlet zone 89 above the solids level. The varying quantity of this gas varies the rate at which solids are removed from zone 89a via apertures 90 to maintain the level of solids. The lift gas suspension passes upwardly at a velocity above the settling velocity through lift line 32 which comprises any form of hollow conduit, and enters lift line extension 99 in separator 36. In Figure 1 lift line 32 is shown as a single hollow tube of circular cross section arranged coaxially with induction zone 31 and lift line or conduit extension 99 in impactless separator zone 36. However, in installations where larger quantities of granular adsorbent must be handled, a multiplicity of parallel tubes may be employed.

That portion of lift line 32 extending into impactless separator 36 comprises extension or depressuring zone 99 and is provided with perforations 91 which in Figure 1 are indicated as being a series of longitudinal slots. In this manner the pressure and the velocity of the lift gas are gradually decreased by allowing the gas to disengage itself from extension zone 99 through the perforations 91 into the annular volume of settling zone 92a in impactless separator 36. As the gas velocity decreases to below the settling velocity gravitational forces act strongly upon the moving adsorbent particles causing them to lose energy of momentum. The solids are transported through perforations 91 to settle in settling zone 92a by the lateral flow of lift gas therethrough. The direction of the particle motion in settling zone 92a is 180° opposed to the direction within lift line 32. Attrition is hereby minimized by causing the separated particles to pass through settling zone 92a outside the tube or tubes of extension zone 99 in the opposite direction to the direction of flow inside the extension zone.

If desired, the entire quantity of lift gas together with the separated adsorbent particles as substantially independent phases may be removed from annular space 92 in impactless separator 36 at a point below extension zone 99 through transfer line 37. If desired, any portion of this lift gas may be by-passed via line 92 controlled by valve 93 into centrifugal separator zone 10a to decrease the gas velocity through transfer line 37. If desired all or any part of the lift gas may be recirculated directly from separator 36 via line 92 and lift gas return line 39 through by-pass 97 controlled by valve 98. In this way, the elutriation of the circulating adsorbent may be carried out in separator 36.

In the upper portion of selective adsorption column 10 at the junction of the column proper and transfer line 37 is positioned a mechanism by means of which the lift gas and granular adsorbent may be separated and the adsorbent introduced into the column. This mechanism is provided with lift gas downcomer tubes 94 and adsorbent distribution tubes 95. Downcomer tubes 94 connect directly with centrifugal separator zone 10a while adsorbent distribution tubes 95 pass indirectly therethrough into adsorbent storage zone 11. Centrifugal separator zone 10a comprises upper and lower transverse plates or trays filling the entire cross section of selective adsorption column 10 and are provided with a series of centrifugal separators such as cyclones which are well known to those skilled in the art. These separators are provided with a solids outlet opening into adsorbent storage zone 11 and a lift gas outlet opening into gas header 96. The lift gas passes from gas header 96 via line 38. A portion of this gas may be returned via lift gas return line 39 to form further quantities of lift gas-adsorbent suspension and a portion is continuously removed via line 40 controlled by valve 41 at a predetermined rate controlled by flow recorder controller 84.

The centrifugal separators positioned in zone 10a serve to recover suspended particles of adsorbent from the lift gas which are of a desirable size for further use in the circulating adsorbent stream while leaving those adsorbent particles which are considered undesirable in the circulating adsorbent stream suspended in the elutriation gas. Generally particles which are smaller than about 60 mesh are kept in suspension while those larger than 60 mesh are separated from the gas stream by the centrifugal separators in centrifugal separator zone 10a. The elutriation gas containing these suspended fines subsequently passes via line 39 into centrifugal separator 80 in which a substantially complete separation of fines is effected. Separated fines, smaller than about 60 mesh are removed therefrom by means of line 81 controlled by valve 82 and the solid free lift gas is passed by means of line 83 into lift gas blower 33. Removal of adsorbent fines in this manner substantially completely eliminates problems arising from erosion of the lift gas blower rotor. The maximum average particle size of the adsorbent fines thus removed from the adsorbent circulated through adsorption column 10 is determined by the controlled velocity at which the lift gas passes through centrifugal separator zone 10a and the mechanical design of the separators therein.

Line 38 carrying the lift gas removed from centrifugal separator zone 10a also carries the purge gas which passes upwardly through cooling zone 12, adsorbent storage zone 11, into zone 10a. The purge gas flow rate is controlled by flow recorder controller 84 which actuates valve 41 in line 40. The gas thus continuously removed may be returned with the feed gas, produced as a prdouct gas, sent to fuel, flared, or otherwise disposed of in a manner not shown. The removal may, if desired, be made intermittently, but continuous removal is preferred.

Line 85 controlled by value 86 is provided to pass the adsorbent from column 10 into a storage bin or through a reactivation vessel. A small portion of the circulating adsorbent, between about 1% and 25% by weight, is subjected to a continuous high temperature steam reactivation treatment to remove higher molecular weight materials which may be present in the adsorbent.

A portion of the lift gas introduced into induction zone 31 passes upwardly through transfer line 30 countercurrent to the downwardly flowing adsorbent. This gas is removed from flow control valve 27 by means of line 45 controlled by valve 46 to prevent the upflow of lift gas into the lower part of the selective adsorption column. Simultaneously a portion of the stripping gas introduced into bottom zone 25 by means of line 47 controlled by valve 48 flows downwardly through sealing leg 26 concurrently with the adsorbent and this portion of stripping gas is also removed by means of line 45 controlled by valve 46 as a seal gas which effectively isolates the lower portion of the selective adsorption column from the induction zone of the lift gas system.

The apparatus described in Figure 1 is readily applicable to the production of ethylene, for example, from a mixture of cracked gases obtained from the pyrolysis of the normal liquid or gaseous petroleum fractions. Operating conditions for the production of ethylene by thermally cracking a gas oil and recovering ethylene by selective adsorption from the cracked gas product are given below as a practical example:

EXAMPLE I

The selective adsorption column was employed to recover the ethylene present in a demethanizer overhead gas which had the following composition:

Table 1.—*Demethanizer overhead gas or adsorption column feed gas analysis*

| Ingredient: | Mol per cent |
|---|---|
| Hydrogen | 39.8 |
| Nitrogen | 1.7 |
| Carbon monoxide | 0.9 |
| Oxygen | 0.1 |
| Methane | 51.3 |
| Carbon dioxide | 0.2 |
| Acetylene | 0.2 |
| Ethylene | 5.8 |
| Ethane | Trace |
| Total | 100.0 |

The selective adsorption process and apparatus developed to separate the ethylene from this feed gas employed 15,000 pounds of activated charcoal as the adsorbent which was circulated through the column at a rate of 18,000 pounds per hour. The selective adsorption column was self-supporting, 4.5 feet in diameter and 85 feet in height. A charcoal storage vessel 4.0 feet in diameter and 60 feet high was provided to hold make-up charcoal to be added as required to maintain a level in the top of the column and also to hold charcoal removed from the column during inspection.

The feed gas stream having the composition shown in Table 1 flowed at a rate of 73,900 s. c. f. (standard cubic feet) per hour and was available at 120 pounds per square inch gauge pressure and a temperature of $-130°$ F.

The gas was depressured to 75 pounds per square inch gauge pressure and interchanged to atmospheric temperature to recover refrigeration. This gas was introduced through line 50 controlled by valve 51 into feed gas engaging zone 17. The gas thus introduced passes upwardly through adsorption zone 16 countercurrent to the downwardly flowing lean charcoal at a temperature of 120° F. The ethylene content of the feed gas is thus adsorbed along with a small proportion of carbon dioxide and methane which are less readily adsorbable. The charcoal temperature was raised to 150° F. by the ethylene adsorption. The major proportion of the methane and substantially all of the less readily adsorbable constituents remain as an unadsorbed lean gas.

The lean gas passes upwardly and enters lean gas disengaging zone 15. A portion of this lean gas is removed from lean gas disengaging zone 15 at 120° F. by means of line 52 controlled by valve 53 and is introduced into separator 54 wherein suspended charcoal fines are removed. The separated fines pass through line 55 controlled by valve 56 out of separator 54. The lean gas is removed from separator 54 at a rate of 44,825 s. c. f. per hour by means of line 57. The composition of the lean gas is as follows:

*Table 2.—Lean gas analysis*

| Ingredient: | Mol per cent |
|---|---|
| Hydrogen | 31.6 |
| Nitrogen | 1.4 |
| Carbon monoxide | 0.8 |
| Oxygen | 0.1 |
| Methane | 66.1 |
| Carbon dioxide | — |
| Acetylene | — |
| Ethylene | — |
| Ethane | — |
| Total | 100.0 |

The dew point of the lean gas product is very low, less than −100° F., made possible by the desiccating action of the absorbent.

The remaining portion of the unadsorbed gases which is not removed with the lean gas comprises a purge gas which passes upwardly through the tubes of adsorbent cooling zone 12 countercurrent to the downwardly flowing charcoal into elutriation zone 10a. This gas serves to saturate the lean cool charcoal with the constituents of the lean gas product and also to dehydrate the lean charcoal. During the passage of this purge gas through cooling zone 12 a partial enrichment of the purge gas in the less readily adsorbable constituents occurs so that the purge gas passing into elutriation zone 10a from hopper 11 and leaving the upper portion of selective adsorption column 10 has the following composition:

*Table 3.—Purge gas analysis*

| Ingredient: | Mol per cent |
|---|---|
| Hydrogen | 61.8 |
| Nitrogen | 2.5 |
| Carbon monoxide | 1.3 |
| Oxygen | 0.2 |
| Methane | 33.7 |
| Carbon dioxide | 1.0 |
| Acetylene | — |
| Ethylene | 0.4 |
| Ethane | — |
| Total | 100.0 |

This gas may be produced as a third fraction, if desired, through lines 38 and 40 controlled by valve 41.

The volumetric rate of flow of the purge gas is 24,600 s. c. f. per hour. Comparison of the composition of the purge gas shown in Table 3 with the composition of the lean gas shown in Table 2 indicates that a substantial proportion of the methane present in the lean gas is adsorbed by the charcoal from the purge gas and that the hydrogen concentration nearly doubles. The composition of the purge gas shown in Table 3 is substantially the same as the composition of the lift gas employed for transporting charcoal removed from the bottom of selective adsorption column 10 to the top of the column. The lift gas is recirculated through the system at a rate of 271,000 s. c. f. per hour. The quantity of gas removed through line 40 controlled by valve 41 and flow recorder controller 84 is about 25,000 s. c. f. per hour.

The quantity of charcoal in the system at any given time is indicated by high level alarm 58 and low level alarm 59 provided in charcoal hopper 11. It is desirable to maintain a constant level of charcoal in hopper 11 and additional quantities of charcoal are introduced by means of line 60 controlled by valve 61 from a storage line, not shown but previously described, to maintain such a level of the charcoal at the desired position. The total quantity of charcoal in the system is thus maintained at about 15,000 pounds.

A reactivator, not shown, is provided through which about 5% by weight of the charcoal flow is by-passed. The adsorbent is subjected to a high temperature steam treatment to maintain the adsorptivity of the charcoal. This charcoal is removed from transfer line 37 through line 85 controlled by valve 86 and passes through the reactivator. The treated charcoal is introduced by means of line 30a controlled by valve 31a into transfer line 30.

The rich charcoal formed in adsorption zone 16 containing adsorbed ethylene and small quantities of the less readily adsorbable constituents passes downwardly through feed gas engaging zone 17 and is introduced into rectification zone 18 wherein it is countercurrently contacted with a rich gas reflux consisting of substantially pure ethylene. This reflux serves to substantially completely desorb adsorbed quantities of methane from the rich charcoal leaving a rectified charcoal containing adsorbed reflux ethylene which raised the temperature to 210° F. The rectified charcoal thus formed passes downwardly through rich gas disengaging zone 19 into steaming zone 20 wherein it is heated to 365° F. by steam adsorption. The major portion of the adsorbed ethylene is preferentially desorbed in steaming zone 20 and the charcoal passes into heating zone 21. In heating zone 21 the charcoal is indirectly heated by means of flue gas or condensing vapors such as steam or mixtures of diphenyl and diphenyl oxide whereby the charcoal is heated to a temperature of about 510° F. Stripping gas is introduced at a rate of about 375 pounds per hour into bottom zone 25 by means of line 47 controlled by valve 48. A small portion of this steam passes downwardly and is removed as a seal gas through line 45, as previously described, while the major proportion passes upwardly through the tubes of heating zone 21 countercurrent to the downwardly flowing hot charcoal. By the combination of stripping steam and indirect heating, a substantially complete desorption of the remaining adsorbed ethylene is effected and the gas thus desorbed passes upwardly into rich gas disengaging zone 19. The charcoal carrying the adsorbed steam passes down through the tubes to hotter areas where the steam is desorbed. This striping gas recycle amounts to about 1200 pounds per hour so that the total effective stripping gas rate is about 1575 pounds per hour.

A portion of the thus desorbed ethylene passes upwardly through rich gas disengaging zone 19 into rectification zone 18 wherein it serves as the rich gas reflux mentioned above. The remaining portion of rich gas is removed from rich gas disengaging zone 19 by means of line 65 controlled by automatic control valve 66. Control valve 66 is actuated by thermocouple 67 and temperature recorder controller 68. The presence of the rich gas reflux in rectification zone 18 exerts a temperature effect in conjunction with the preferential desorption of less readily adsorbable constituents from the rich charcoal by the rich gas reflux. The charcoal in equilibrium with the feed gas above thermocouple point 67 is at a temperature lower than that of the rectified charcoal in equilibrium with the rich gas reflux in rectification zone 18. The rich gas product passes through control valve 66 at a controlled rate and is introduced into rich gas cooler 69 wherein at least a portion of the stripping gas removed from rich gas disengaging zone 19 is condensed. The cooled rich gas product and the condensed stripping gas are introduced together into vapor liquid separator 70. The condensed stripped steam collects in the lower portion of separator 70 and is removed therefrom by means of line 71 controlled by valve 72 which in turn is actuated by liquid level controller 73. The condensate thus removed may, if desired, be returned to an evaporator and reintroduced as stripping gas by means of line 47. The rich gas product is removed from separator 70 by means of line 74 controlled by valve 75 at a rate of 4475 s. c. f. per hour. This ethylene stream is passed through activated aluminum oxide driers to remove remaining traces of moisture and may be combined with the ethylene product from the ethylene tower of the low temperature fractionation equipment if desired.

The composition of the rich gas product thus produced is given as follows:

*Table 4.—Rich gas product analysis*

| Ingredient: | Mol per cent |
|---|---|
| Hydrogen | — |
| Nitrogen | — |
| Carbon monoxide | — |
| Oxygen | 0.1 |
| Methane | — |
| Carbon dioxide | 2.9 |
| Acetylene | 3.6 |
| Ethylene | 92.7 |
| Ethane | 0.7 |
| Total | 100.0 |

The lean stripped charcoal formed in heating zone 21 is conveyed through lift line 32 passed through elutriation zone 10a and is reintroduced into hopper 11 at a temperature of about 420° F. to be reused in the process.

The selective adsorption process above described effects nearly a 100% recovery of ethylene present in the feed gas and produces it as a rich gas product of nearly 93% purity, the remaining 7% being mostly C₂ hydrocarbon.

The success of selective adsorption process in circulating substantial quantities of a granular solid adsorbent at high rates while at the same time maintaining an extremely low attrition or abrasion loss is due to the method for conveying the granular adsorbent from the bottom to the top of the column in the form of a gaseous suspension. The degree of attrition reduction achieved by this method is shown in the following examples. The method briefly described above for recovering the suspended adsorbent in an impactless separator zone further contributes materially to the ability of the selective adsorption process to employ a moving bed of granular adsorbent with a very minor attrition of the circulated solids.

The preferred adsorbent in the selective adsorption process comprises activated nut hull or fruit pit charcoal although other charcoals and such adsorbents as activated aluminum, iron, magnesium, chromium, and other metal oxides as well as silica gel and the like may also be used.

A detailed view of a vertical cross section of the upper portion of selective adsorption column 10 is shown in Figures 2 and 3. Parts of the apparatus shown in Figures 2 and 3 which are also indicated in Figure 1 are indicated in Figures 2 and 3 with the same numbers.

Referring now more particularly to Figure 2, the lift gas suspension of solid granular adsorbent is conveyed by means of lift line 32 which in this modification comprises tubes 101 and 102 having extensions 126 and 127 open at the upper ends and having substantially the same diameter into impactless separator 36. Settling section 92a thus formed comprises the remaining volume of the separator. Extensions 126 and 127 of tubes 101 and 102 in separator 36 are provided with a series of perforations which may be lateral, longitudinal or helical slots, punched holes or other apertures which permit the lift gas to flow radially from its flow direction through extensions 126 and 127. In the modifications shown in Figure 2 these apertures comprise a series of three longitudinal slots, each 0.5 inch wide in 3-inch nominal diameter tubes, through which a portion of the lift gas passes during passage of the suspension through the upper part of the lift lines. The lift gas velocity in the tubes, therefore, gradually decreases allowing the momentum of the particles being conveyed to dissipate against forces of gravity and friction against the lift gas. This radial flow of lift gas also causes the suspended particles to move laterally through the slots and enter annular settling zone 92a. The flow direction inside the lift line is upward while the outside extensions 126 and 127 are downward. Thus the rising particles are prohibited from contacting the falling particles of adsorbent. When helical or lateral slots are employed, helical baffles may be used inside and/or outside of tubes 101 and 102 to lower the separated adsorbent gradually to transfer line 37.

The ratio of total slot width to tube periphery is between about 1 to 10 and 1 to 2 and preferably about 1 to 6 although ratios from as low as 1 to 25 may be used. In other words, the total width of the openings around the periphery of the extensions is between about 10% and about 50% and preferably about 16.7% of the periphery although widths from as low as about 4% of the extension periphery may be used. By varying the slot width to periphery ratio, the rate at which the lift gas velocity is decreased in the perforated extension of the lift line may be controlled. The proper value of this ratio depends upon the type of solids being conveyed and the lift gas velocity.

As above described, all or a portion of the lift gas may be withdrawn from impactless separator 36 by means of coupling 104 and the gas thus removed is passed by means of a line not shown into centrifugal separator zone 10a via coupling 105. The adsorbent particles descend through settling zone 92a and separate from the lift gas outside extensions 126 and 127 to form a moving bed 106 passing downwardly along the lower surface of transfer line 37. A series of baffles, not shown, may be positioned from the lower surface of transfer line 37 to impede the downward flow of separated granules. The general construction of transfer line 37 employs an angle of about 45° with respect to the vertical axis of selective adsorption column 10. The velocity of the granules flowing through transfer line 37 is therefore kept low to minimize attrition loss.

The lower portion of transfer line 37 connects by means of collar 107 at a 45° axial angle and connects directly into the upper portion of selective adsorption column 10. The moving bed of granular adsorbent discharges into conical section 108 through which extend a series of lift gas downcomer tubes 109. These tubes carry the lift gas from transfer line 37 independent of the adsorbent phase directly into elutriation zone 10a which is included between transverse plates 114 and 115. This gas, together with that portion of lift gas introduced directly from the upper portion of impactless separator 36 via line 92 shown in Figure 1 passes through centrifugal separators 110 to effect the separation of desirable size adsorbent granules which remain suspended in the lift gas. A portion of this lift gas may be by-passed through line 122a controlled by valve 122b to control the degree of elutriation. The thus separated granules drop from separators 110 directly into adsorbent hopper 11 to be recirculated with the main adsorbent stream. The elutriated lift gas passes upwardly from separator 110 into lift gas header 111 and subsequently pass into conduit 120 to the left of plate 112 which separates the outgoing lift gas from the adsorbent and lift gas descending through transfer line 37. The lift gas is removed from conduit 120 via connection 113 for treatment as above described.

The adsorbent passes downwardly through the lower part of transfer line 37 collects in that part of conical section 108 to the right of plate 112. From the bottom of conical section 108 extends a series of adsorbent downcomer tubes 116 through each of which an equal quantity of adsorbent passes through and independently of centrifugal separator zone 10a for discharge directly into adsorbent storage zone 11. The lower extremities of tubes 116 may be slotted or otherwise perforated to permit the adsorbent to discharge readily should level 117 of adsorbent in storage zone 11 rise or fall.

Figure 3 shows the plan view of a cross section of the apparatus shown in Figure 2. The cross section of separator 36 is indicated showing three parallel lift tubes including tubes 101 and 102 provided with slots 103. Transfer line 37 is shown by means of which the separated lift gas and adsorbent pass into conical section 108 positioned within collar 107. The position of lift gas downcomer tubes 109 is shown extending through conical section 108 and plate 112 serves to form conduit 120 upwardly through which the lift gas passes from lift gas header 111 shown in Figure 2. In Figure 3 the lower end of transfer line 37 immediately adjacent to conical section 108 and collar 107 is provided with baffle plates 121 and 122 causing the downwardly flowing adsorbent to empty directly into cylinder 123. Cylinder 123 and baffles 121 and 122 are not shown in Figure 2 for the sake of clarity. The open area between the nearest edges of baffles 121 and 122 form a weir through which the adsorbent empties into cylinder 123. Cylinder 123 is further provided with separator plates 124 and 125 thereby dividing cylinder 123 into a series of sectors.

The plane defined by the intersection of conical section 108 and cylinder 123 is a bottom plate from which adsorbent distributor tubes 116 convey adsorbent from each sector downwardly into adsorbent storage zone 11 shown in Figure 2.

The position of centrifugal separators 110 shown in Figure 2 is outlined in dotted lines around collar 107. Thus Figure 3 comprises a plan view of a cross section of the upper portion of selective adsorption column 10 which when considered with a cross sectional elevation view shown in Figure 2 clearly shows all associated parts of the apparatus employed to carry out the method of conveying granular solids substantially without attrition loss.

The foregoing description and drawings have been limited to a particular modification of impactless separator in which a series of elongated narrow slots in the upper end of the lift line tubes inside the separator is used. The width of these slots is preferably a minor fraction of the total lift line tube periphery so that the lift gas flows outwardly through the perforated end of lift line over an appreciable portion of its perforated length thereby gradually decreasing the lift gas velocity and pressure from the value in the lift line to a lower value at which the solids readily separate. This reduction removes the lifting forces on the particles and allows gravitational forces to dissipate momentum energy reducing their velocity to zero before they are able to impinge against exposed surfaces such as the upper portion of the impactless separator.

The perforated length of lift line comprising the extension zone inside the impactless separator may be provided with other types of apertures which also permit the gradual decrease in lift gas velocity and usually expose small amounts of surface area to particle impingement. Where long slots have been employed above, a series of relatively short slots having their major axis parallel or make any angle to that of the lift line tube may be employed. If desired the apertures may comprise a series of open holes such as those obtained by boring, drilling, or other operations performed upon the tube wall. In certain installations square holes such as those obtained by punching may be employed. Other sort of apertures besides those mentioned may be used such as openings prepared by sawing out sections of the tube wall to leave slots which are greater in peripheral distance than in longitudinal distance. The first type, however, is the preferred type since it has been found that the long longitudinal slots are easy to fabricate by acetylene burning or by milling or punching operations and that by varying the width of the slot over its length a gradual decrease in the lift gas velocity of any predetermined desired magnitude may be obtained.

The following examples are illustrative of the marked reduction in attrition rate of a granular charcoal adsorbent circulated in the improved process of this invention by the solids conveyance method herein disclosed:

EXAMPLE II

In a commercial selective adsorption column for the separation of ethylene from a gaseous mixture, the process of which is described in Example I, a lift line having a nominal diameter of 10 inches is employed in conjunction with an impactless separator having a nominal diameter of 20 inches. The lift line consists of a single tube and is not provided with slots or other apertures as is the improved conveyance and apparatus of this invention. The granular charcoal circulation rate of 18,000 pounds per hour and an attrition rate of 4.16 pounds per hour is noted. The attrition rate is best expressed as a per cent of the circulation rate per cycle. The attrition rate is proportional to the number of cycles that the adsorbent or other granular material is circulated through the apparatus. In this commercial selective adsorptive installation the attrition rate is 0.023% per cycle at a circulation rate of 18,000 pounds per hour.

EXAMPLE III

In another installation the single 10-inch lift line was substituted by a series of 10 3-inch lift lines in parallel having nearly the same cross sectional area and which discharged into an impactless separator having a nominal diameter of 20 inches. These lines had no apertures to permit gradual lift gas velocity reduction. The charcoal adsorbent circulation rate in this rate was 17,900 pounds per hour and the attrition rate under these conditions was found to be 0.011% per cycle. This shows approximately a 50% reduction in attrition rate through the use of a multiple tube lift line instead of a single tube of large diameter as in the foregoing example.

EXAMPLE IV

An installation constructed according to the principles of the present invention and employing 10 3-inch nominal diameter tubes as a lift line was employed to circulate 19,400 pounds of granular charcoal per hour. The multiple tube lift line extended into an impactless separator having a nominal diameter of 20 inches and the lift line tubes contained therein were provided each with 3½-inch longitudinal slots spaced 120° from each other. The length of the slots was approximately eight feet. The attrition rate of the granular charcoal circulated through this apparatus was found to be 0.0006% per cycle at a circulation rate of 19,400 pounds per hour. This remarkably low rate of attrition constitutes a 97% reduction in adsorbent attrition from the attrition rate encountered in using a single large diameter lift line circulating only 18,000 pounds per hour.

The foregoing description and examples of the improved adsorption process of this invention pertain to one in which a particularly desirable method of solid adsorbent conveyance is incorporated whereby loss of adsorbent due to attrition is brought to a minimum. The solid conveyance method is of course applicable to processes other than that of continuous selective adsorption and it is not to be understood that the description of the selective adsorption process is to be considered as a limitation thereto.

The method of solid conveyance with its desirable inherent characteristics may be applied to processes such as catalytic operations including catalytic cracking and reforming operations to convey the catalyst from the bottom to the top of the same vessel or to a treating or regeneration vessel. In the case of catalysts, the lift gas which may be employed may be determined depending upon the particular conditions under which the catalyst is being treated. For example, if the catalyst is to be introduced into a regeneration zone in which carbon is to be burned from its surface, the catalyst particles may be suspended in a moving stream of flue gas or preheated air which in addition to transporting the catalyst granules or pellets to a desired location may be employed to preheat the catalyst during its conveyance. This method of solids conveyance lends itself to the use of a gaseous seal stream whereby the gases present in the vessel or system from which the catalyst is removed is prevented from entering another system or vessel into which the catalyst is to be introduced.

The particular solids conveyance methods of this invention may be further adapted to the conveyance of solid particles of substantially any type including adsorbents, catalysts, minerals, solid chemical reagents employed and chemicals manufacture, in plastic manufacture, in the transportation of agricultural products such as for example the cereal grains, the conveyance of solid fuels in which attrition is to be minimized and innumerable other applications.

The improved selective adsorption process and the incorporated method for solids conveyance may be operated at subatmospheric or superatmospheric pressure depending upon which type of pressure conditions favors the gaseous mixture separation. The method of solids conveyance may be effected under pressure if desired.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus which comprises an impactless separator chamber in solids receiving relation to a conveyance conduit conveying a suspension of solids in a fluid, an extension of said conduit opening coaxially into and extending substantially through said impactless separator chamber, said extension being provided with a plurality of relatively narrow elongated openings arranged parallel to one another around the periphery of said extension and having a total width of between about 4% and about 50% of the extension periphery and adapted to the lateral flow of fluid and solids therethrough thereby gradually decreasing fluid velocity in said extension while depositing separated solids by gravity in said impactless separator chamber, means for controlling the rate of suspension introduction into said apparatus to maintain the lateral flow of fluid and solids from said extension through an appreciable portion of its perforated length and insufficient to impinge said solids against exposed surfaces in the upper portion of said separator chamber, and a transfer line for removing separated solids and conveyance fluid as substantially independent phases from the lower end of said impactless separator chamber.

2. An apparatus which comprises, in combination with an elongated conveyance conduit for the conveyance of granular solids suspended in a fluid, an impactless separator chamber communicating with said conveyance conduit, a coaxial extension of said conduit extending substantially through said separator chamber said extension conduit being provided with a plurality of lateral openings comprising parallel relatively narrow elongated slots and an open upper end, said extension having a total lateral opening width to extension periphery ratio of between about 1 to 2 and about 1 to 25 whereby a lateral flow of fluid and solids occurs through said lateral openings thereby gradually decreasing the fluid velocity within said extension conduit while depositing separated solids by gravity in said impactless separator chamber, means for controlling the rate of suspension introduction into said apparatus to maintain the lateral flow of fluid and solids from said extension through an appreciable portion of its perforated length and insufficient to impinge said solids against exposed surfaces in the upper portion of said separator chamber, a transfer conduit for removing the thus separated solids and at least a portion of said fluid from the bottom of said impactless separator chamber, and separate conduit means for removing the remaining portion of said fluid therefrom.

3. An apparatus which comprises an impactless separator chamber in solids receiving relation to conduit means for conveying a suspension of solids in a fluid, an axial extension of said conduit means opening into and substantially through said impactless separator chamber forming an extension section therein and a settling chamber surrounding said extension section, said extension section being provided with an open end and a plurality of lateral openings therein to permit the radial passage of portions of said lift fluid and suspended solids therethrough along at least part of the length of said extension section and into said settling section thereby gradually reducing the velocity of fluid flowing within said extension section while depositing solids by gravity in said settling section substantially without attrition loss, the total width of said lateral openings at any point along said extension section being between about 4% and about 50% of the total extension section periphery at that point, means for controlling the rate of suspension introduction into said apparatus to maintain the lateral flow of fluid and solids from said extension through an appreciable portion of its perforated length and insufficient to impinge said solids against exposed surfaces in the upper portion of said separator chamber, and outlet conduit means for removing the thus separated solids and conveyance fluid from the bottom of said settling section.

4. An apparatus according to claim 3 wherein said extension section comprises a tubular member having substantially the same diameter as said conduit means for conveying said suspension.

5. An apparatus according to claim 3 wherein said lateral openings for decreasing fluid velocity within said extension section comprises a series of relatively narrow elongated longitudinal slots in the wall of said extension conduit.

6. An apparatus which comprises, in combination with a solids conveyance means comprising a multiplicity of parallel conveyance conduits adapted to the conveyance of granular solids in suspension in a conveyance fluid, an elongated impactless separator chamber in solids receiving relation to said conveyance means, a multiplicity of parallel extension conduits each coaxial with a conduit in said conveyance means, said extension conduits opening into and extending substantially entirely through said impactless separator chamber and forming a settling chamber therein surrounding said extension conduits, each of said extension conduits being provided with a series of relatively narrow elongated longitudinal slots having a total slot width around the periphery thereof of between about 4% and about 50% of said periphery and adapted to the lateral flow of conveyance fluid and suspended solids from said extension conduits into said settling chamber while depositing separated solids therein by gravity substantially without attrition loss, means for controlling the rate of suspension introduction into said apparatus to maintain the lateral flow of fluid and solids from said extension through an appreciable portion of its perforated length and insufficient to impinge said solids against exposed surfaces in the upper portion of said separator chamber, transfer line means for removing separated granular solids and a portion of said conveyance fluid as substantially independent phases opening from the bottom of said settling chamber, and separate outlet means for removing the remaining portion of said conveyance fluid containing suspended solids fines from said impactless separator chamber at a point adjacent the upper extremity of said extension conduits.

7. An apparatus which comprises, in combination with a solids conveyance means comprising a multiplicity of parallel conveyance conduits adapted to the conveyance of granular solids in suspension in a conveyance fluid, an elongated impactless separator chamber in solids-receiving relation to said conveyance means, a multiplicity of parallel extension conduits each coaxial with a conduit in said conveyance means, said extension conduits opening into and extending substantially entirely through said impactless separator chamber and forming a settling chamber therein surrounding said extension conduits, each of said extension conduits being provided with a plurality of relatively narrow parallel elongated longitudinal slots having a total slot width around the periphery thereof of between about 4% and about 50% of said periphery and adapted to the lateral flow of conveyance fluid and suspended solids from said extension conduits into said settling chamber while depositing separated solids therein by gravity substantially without attrition loss, transfer line means for removing separated granular solids and a portion of said conveyance fluid as substantially independent phases opening from the bottom of said settling chamber, separate outlet means for removing the remaining portion of said conveyance fluid containing suspended solids fines from said impactless separator chamber at a point adjacent the upper extremity of said extension conduits, a fines separator means for separating suspended solids fines from fluids, a conduit connecting said fines separator means with separate outlet means, means for directly combining at least a portion of the larger sized solids fines separated from said conveyance fluid in said fines separator means with solids removed from the bottom of said settling chamber, and an outlet conduit for removing conveyance fluid from said fines separator means.

8. An apparatus in combination with an elongated conveyance means for the conveyance of granular solids in gaseous suspensions which comprises an elongated impactless separator chamber, an open-ended extension conduit longitudinally disposed within and substantially throughout said separator chamber, said extension conduit being coaxial with said conveyance means and disposed in solids suspension receiving relation therewith and forming an annular settling section surrounding said extension conduit within said separator chamber, a plurality of narrow elongated lateral openings opening through the wall of said extension conduit substantially throughout its entire length whereby a lateral passage of conveyance gas and suspended solids flows through said lateral openings thereby gradually decreasing the conveyance gas velocity through said extension conduit and passing granular solids through said openings into said settling chamber, means for controlling the rate of solids suspension injection into said apparatus to maintain said lateral passage of gas and suspended solids through at least an appreciable length of said openings in said extension conduit and insufficient to cause impingement of solids against any transverse structural surface in the solids discharge path, said lateral openings at any point along the length of said extension conduit having a total width of between about 4% and about 50% of the extension conduit periphery at the same point, an outlet conduit from the bottom of said settling chamber for separated solids, and means for removing conveyance gas from said separator chamber.

9. An apparatus which comprises, in combination with a conveyance means for forming and conveying a gas-solids suspension, an impactless separator chamber enclosing an extension conduit therein, said extension conduit being in coaxial gas-solids suspension receiving relation to said conveyance means and extending substantially throughout the length of said separator chamber, a settling chamber surounding said extension conduit within said separator chamber, said extension conduit being provided with a series of narrow elongated longitudinal slots arranged parallel to one another around the periphery of said extension conduit and extending substantially throughout the length thereof and adapted to the radial passage of gas and suspended solids, means for controlling the velocity of said gas-solids suspension into said extension conduit to maintain said lateral passage of gas and solids through an appreciable portion of the slotted length of said extension conduit but insufficient to cause impingement of said solids against any surface transverse to the axis of said extension conduit, said gas and solids thereby flowing laterally from said extension conduit into said annular settling chamber to decrease the velocity of the gas-solids suspension passing through said extension conduit gradually thereby depositing separated solids by gravity substantially without attrition loss in said settling chamber, said slots totalling in width between about 4% and about 50% of the periphery of said extension conduit, outlet transfer line means for removing the thus separated solids and at least a portion of said lift gas from the lower end of said settling chamber, and separate outlet means therefrom for removing the remaining portion of said lift gas at a point adjacent the upper end of said separator chamber.

10. An apparatus which comprises, in combination with a multiplicity of parallel elongated tubular conveyance conduits adapted to convey granular solids suspended in a lift gas, an impactless separator chamber surrounding a multiplicity of parallel elongated extension conduits which are open at their upper ends and extend substantially throughout the length of said separator chamber, each extension conduit being coaxial with one of said conveyance conduits thereby forming an annular settling chamber around said extension conduits and within said impactless separator chamber, said extension conduits being provided with a series of relatively narrow elongated longitudinal slots extending substantially throughout the length of said extension conduits and adapted to the radial flow of said lift gas and suspended solids therethrough into said settling chamber to deposit therein conveyed solids by gravity substantially without attrition loss, said slots totalling in width between about 4% and about 50% of the periphery of said extension conduit, a gas outlet conduit opening from the top of said separator chamber for removing a portion of said lift gas, a transfer line opening from the lower portion of said settling chamber for removing separated solids and the remaining portion of said lift gas therefrom, a solids elutriator provided with a series of centrifugal separators, each separator having a gas outlet opening into an elutriation gas header, a conduit for gas opening from said gas outlet conduit at the top of said separator chamber into said elutriator, conduit means for introducing said gas phase from said transfer line into said elutriator to enter said centrifugal separators, outlet means for removing the larger sized solids fines from said centrifugal separators, means for combining said larger solids fines with solids flowing through said transfer line from said settling chamber forming a combined stream of fines-free solids of desirable mesh size range, and an outlet conduit for removing an elutriation gas containing suspended small solids fines from said elutriation gas header.

References Cited in the file of this patent

UNITED STATES PATENTS

| Number | Name | Date |
|---|---|---|
| 914,105 | Boland | Mar. 2, 1909 |
| 1,115,193 | Hay | Oct. 27, 1914 |
| 1,160,283 | Hay | Nov. 16, 1915 |
| 1,422,007 | Soddy | July 4, 1922 |
| 1,498,630 | Jensen | June 24, 1924 |
| 1,823,693 | McLaughlin et al. | Sept. 15, 1931 |
| 1,825,707 | Wagner, Jr. | Oct. 6, 1931 |
| 2,182,165 | Smith | Dec. 5, 1939 |
| 2,384,311 | Kearby | Sept. 4, 1945 |
| 2,407,700 | Huff | Sept. 17, 1946 |
| 2,509,984 | Morrow | May 30, 1950 |